Feb. 9, 1932. F. L. DORNBROOK 1,844,642
APPARATUS FOR HANDLING PULVERULENT MATERIALS
Filed Jan. 28, 1931 2 Sheets-Sheet 1
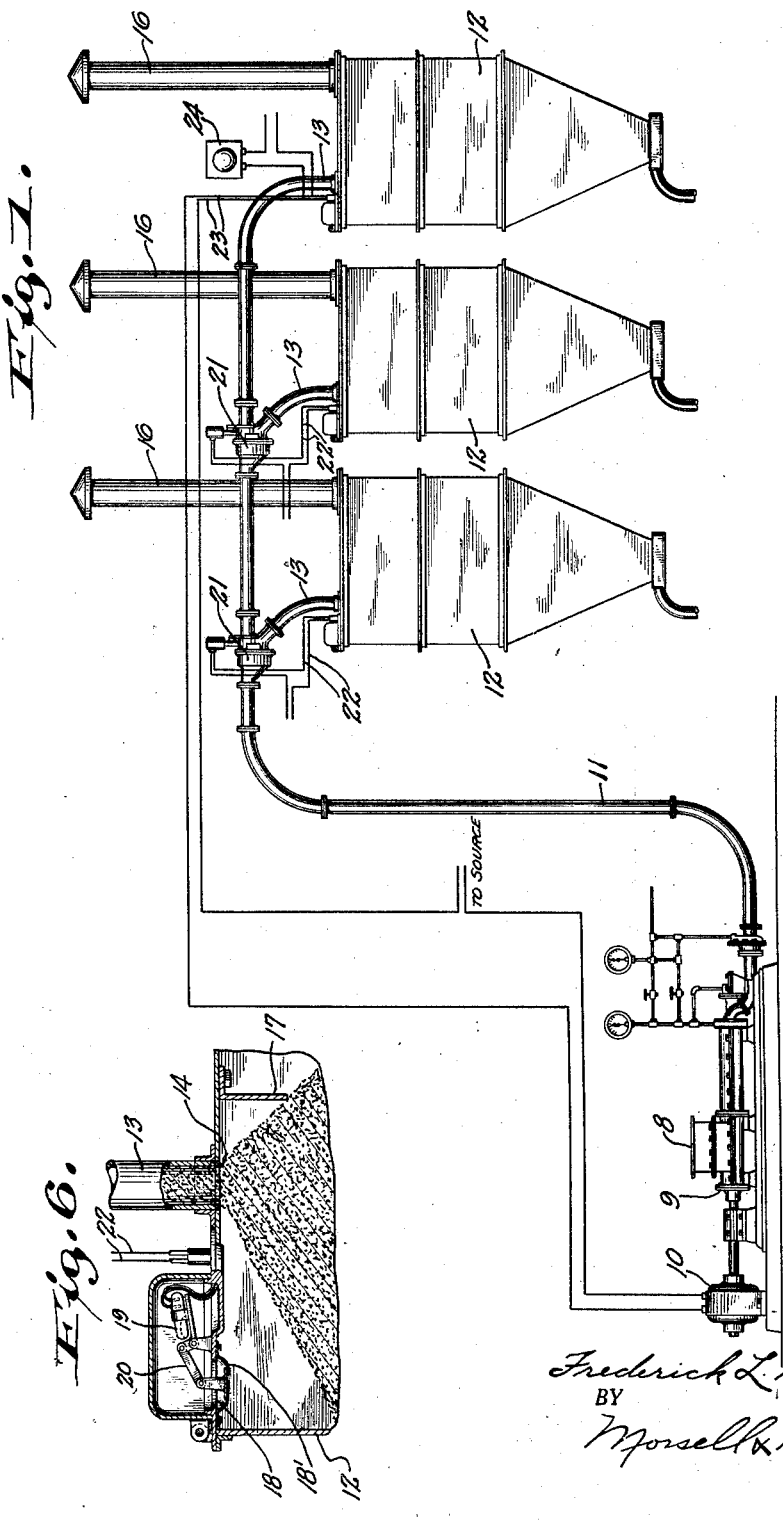

Feb. 9, 1932.   F. L. DORNBROOK   1,844,642
APPARATUS FOR HANDLING PULVERULENT MATERIALS
Filed Jan. 28, 1931   2 Sheets-Sheet 2
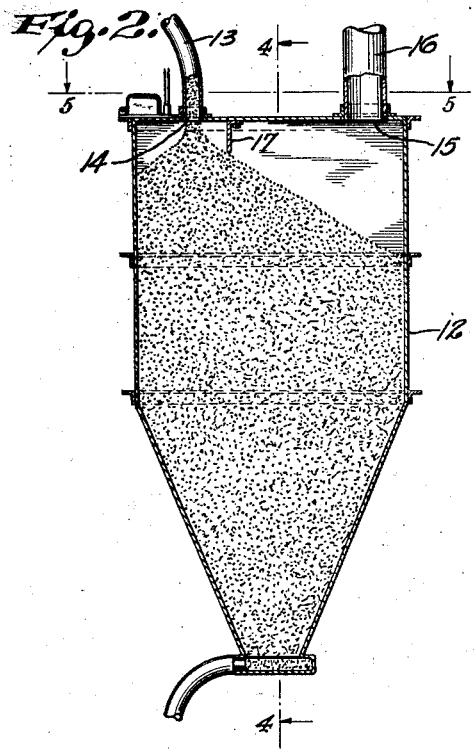
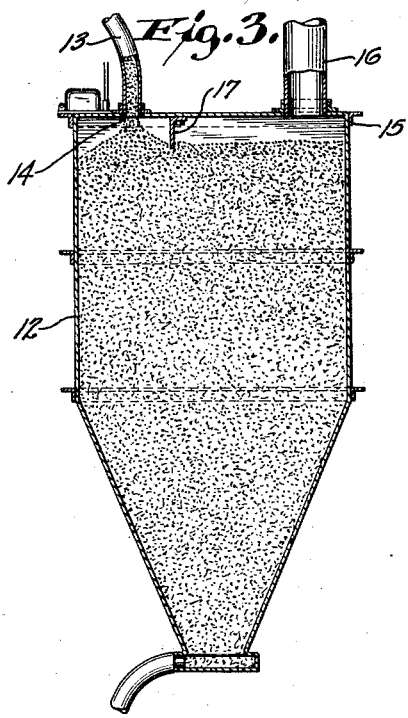
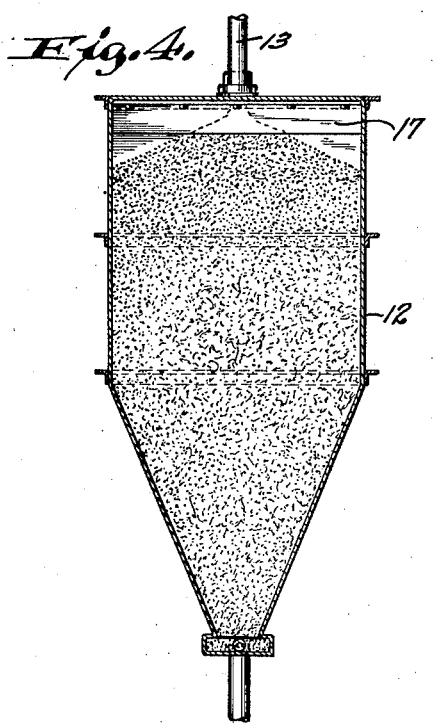
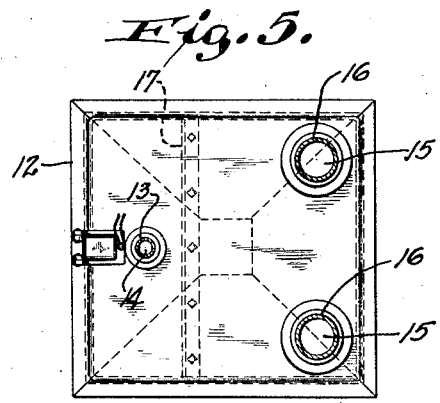
INVENTOR.
Frederick L. Dornbrook
BY Morsell & Morsell
ATTORNEYS Patented Feb. 9, 1932

1,844,642

UNITED STATES PATENT OFFICE

FREDERICK L. DORNBROOK, OF MILWAUKEE, WISCONSIN, ASSIGNOR TO THE MILWAUKEE ELECTRIC RAILWAY AND LIGHT COMPANY, OF MILWAUKEE, WISCONSIN, A CORPORATION OF WISCONSIN

APPARATUS FOR HANDLING PULVERULENT MATERIALS

Application filed January 28, 1931. Serial No. 511,691.

This invention relates to improvements in apparatus for and method of handling pulverulent materials.

In the usual method of filling a bin with pulverized coal, flour, cement, and the like, wherein the material is fed into the bin from a single supply point, the material will invariably form itself into a conical pile, and as a result, part of the storage space of the bin is rendered useless. It has also been usual practice to employ floats or paddles actuated by the material within the bin to operate shut-off valves or alarms when the material has reached a desired level. These devices have proven objectionable because of the fact that the angle of the conical pile formed, changes in accordance with the particular condition of dryness and fineness of the pulverulent material fed into the bin. These variable factors render the actuation of the floats or paddles unreliable and as a result the valve or alarm will either be operated prematurely or after the bin is too full, in the latter instance permitting a considerable quantity of the material to be carried out of the exhaust vent.

It is therefore one of the objects of this invention to overcome the above-mentioned objectionable features of the present constructions and methods by providing an improved apparatus for handling pulverulent material embodying novel means for leveling said material as it is fed into the bin to thereby prevent the formation of the usual conical pile and to eliminate the resulting loss of storage space.

A further object of this invention is to provide an apparatus for handling pulverulent material in which novel means is embodied for automatically operating a valve or signal when a storage bin has been filled to a proper level.

A further object of this invention is to provide an apparatus for handling pulverulent material by means of which a relatively large bin may be properly filled with only one feed pipe to thus effect a material saving of equipment, whereas, heretofore, in order to obtain distribution of the material within the bin, it has been necessary to employ two or more feed pipes.

A more specific object of this invention is to provide an apparatus including a storage bin having a duct for feeding material by compressed air thereinto and having a vent outlet for said compressed air, in which a baffle depending from the top of the bin is utilized, said baffle, when its lower edge is reached by a portion of the material within the bin, acting to so direct the compressed air as to cause the usual conical pile of material to be leveled out, and said baffle when the bin is full, acting in combination with the material to so confine the compressed air as to cause a pressure increase in a portion of the bin separated from the vent to cause the compressed air to operate a pneumatic control for a valve or signal.

A further object of this invention is to provide an improved method of handling pulverulent material by means of which said material is effectively leveled in storage bins, and by means of which a valve or alarm is operated in a reliable manner when the bins are properly filled.

A further object of this invention is to provide an improved apparatus for and method of handling pulverulent material which is simple, effective, and well adapted for the purpose described.

With the above and other objects in view, the invention consists of the improved apparatus for and method of handling pulverulent materials and its part and combinations as set forth in the claims, and all equivalents thereof.

In the accompanying drawings illustrating one complete embodiment of the preferred form of the invention in which the same reference numerals designate the same parts in all of the views:

Fig. 1 is a side elevational view of the improved apparatus, parts being broken away;

Fig. 2 is an enlarged vertical sectional view through one of the bins showing the material therein just prior to its being leveled out;

Fig. 3 is a similar view showing the material within the bin when the bin is full and when said material is leveled out;

Fig. 4 is a sectional view taken on line 4—4 of Fig. 2;

Fig. 5 is a sectional view taken on line 5—5 of Fig. 2; and

Fig. 6 is an enlarged fragmentary vertical sectional view taken through the upper portion of the bin, showing the pneumatic control.

Referring to Fig. 1 of the drawings, the apparatus embodies a feed hopper 8 in which pulverulent material may be placed, apparatus 9 operated by an electric motor 10 for conveying said material by means of compressed air, said apparatus being of any standard type, a feed pipe 11 leading from the apparatus 9, and a plurality of bins 12 connected to the feed pipe 11 by branch feed pipes 13.

The bins, illustrated in Figs. 2 to 5 inclusive, may be of any standard form and may be of any desired dimensions. The branch pipes 13 are arranged to discharge into the upper portion of each bin through an opening 14. One or more openings 15 which are separated a distance from the feed openings have extending upwardly therefrom vent pipes 16. A baffle member 17 extends downwardly from the cover of the bin as shown and is positioned to separate the portion of the upper part of the bin into which the feed pipe extends from the portion to which the vent pipes are connected. In the form shown the baffle extends straight across the bin and is positioned somewhat closer to one side of the bin than the other. This exact position, however, may be varied to suit conditions and requirements. The exact shape of the baffle may also be varied as it may be curved or of any other desired form.

An opening 18 in the upper portion of the bin on the same side of the baffle as the feed pipe is located, has a diaphragm 18' extending therebelow. Above said opening 17 there is mounted any suitable form of switch for the electrical circuit. It is preferred to utilize a switch embodying a tiltable mercury tube 19 which is actuated through levers 20 upon movement of the diaphragm 18. The tilting of said tube will cause closing of an electric circuit in connection with a magnetically operated valve 21 located in the connection between two of the pipes 13 and the main pipe 11. Said magnetically operated valve may be of any standard construction and is connected by means of wires 22 with the mercury tube switch and with a source of electrical current. Each of the magnetically operated valves is adapted to either direct the pulverulent material into one of the branch lines 13 of one bin or to cause said material to flow further through the main pipe 11 to the branch line for the next bin.

The last bin is also provided with a similar mercury tube switch. Said switch, however, is connected by wires 23 with the electric motor 10 of the compressed air apparatus 9. Said mercury tube switch may also be arranged to operate another set of contacts for closing the circuit to an electric signal 24.

In operation of the improved apparatus and method the first valve in the pipe line 11 is in a position to cause the material to flow through the first branch pipe 13 into the first bin. As the material enters said bin it will build up in the usual conical formation until it reaches the position shown in Fig. 2 wherein one side of the conical pile touches the lower edge of the baffle 17. When this condition occurs the compressed air with which the material is fed into the bin cannot pass above the pile of coal and carry part of the surface out through the vent pipes but is forced to travel through the material in order to get around the baffle. In so doing the material will be lifted up and leveled out to the approximate form shown in Fig. 3. When in such position the bin is as full as is desired and there is very little waste space. In order for the compressed air to now pass around to the other side of the baffle it is necessary for it to go through a considerable body of material and this resistance is so great as to cause the compressed air to build up a pressure within the space on the other side of the baffle adjacent the feed pipe and said pressure will soon acquire sufficient strength to cause an upward movement of the diaphragm 18, tilting of the mercury tube 19 and closing of the circuit to the magnetic valve 21. The diaphragm 18 will therefore be constructed to operate at a pressure less than that required to force the compressed air through the pulverulent material and around the partition when the bin is full and leveled. The said valve will then operate to cut off the flow to the first pipe 13 and will cause the material to flow further through the pipe 11 to the second pipe 13 and into the second bin.

When the second bin has been filled and the material leveled therein as before described, the second valve will operate in a similar manner and the material will then be fed to the last bin. When the last bin has been completely filled and leveled the mercury tube control in connection therewith will operate to break the circuit to the motor 10 and to cause operation of the signal 24. Thus, the feeding of additional material will be stopped and the operators will be informed by the signal that the filling operation is complete. There will thus be no danger of overflow or loss of material through the vents and the bins will all be effectively filled without the usual amount of space being left vacant.

The particular type of valve utilized or of control therefor may be varied at will, there being any number of types which can be effectively operated when a predetermined pressure has been built up. As before stated, the baffle member may be shaped or positioned in a different manner from that shown, the main object being to form separated portions in the upper part of the bin to divide the exhaust vents from the intake pipe. Other changes and modifications may also be made and all of said changes are contemplated as may come within the scope of the claims.

What I claim is:

1. Apparatus for handling pulverulent material comprising a receptacle having a feed opening and having a vent opening in the upper portion thereof, means for delivering material by compressed air into said receptacle through said feed opening, means for separating the upper portion of the receptacle having the vent opening from the portion thereof having the feed opening, said means acting to so direct the compressed feeding air, when the material within the bin has reached the separating means, as to cause said compressed air to level said material and prevent the formation of the usual conical pile.

2. Apparatus for handling pulverulent material comprising a receptacle having a feed opening and having a vent opening in the upper portion thereof, means for delivering material by compressed air into said receptacle through said feed opening, a baffle for separating the upper portion of the receptacle having the vent opening from the portion thereof having the feed opening, said baffle acting to so direct the compressed feeding air, when the material within the bin has reached the baffle, as to cause said compressed air to level said material and prevent the formation of the usual conical pile.

3. Apparatus for handling pulverulent material comprising a plurality of receptacles each having a vent opening and a feed opening in the upper portion thereof, a main feed pipe, means for delivering material by compressed air to said feed pipe, branch pipes extending from said main feed pipe to the feed openings in the receptacles, a valve for controlling the flow from said main pipe to the branch pipe of one receptacle, means within said receptacle for separating the upper portion thereof having the vent opening from the portion having the feed opening, said means acting to so direct the compressed feeding air, when the material within the receptacle has reached the separating means, as to cause said compressed air to level said material and acting to confine the compressed air adjacent the feed opening when the material is leveled and the receptacle is substantially full, and means communicating with the interior of the receptacle operable by said confined air when the receptacle is full for operating the valve to the branch pipe to stop the flow of material to said receptacle and to cause it to flow further through the main pipe to the next branch pipe.

4. Apparatus for handling pulverulent material comprising a receptacle having a vent opening and having a feed opening in the upper portion thereof, a feed pipe in connection with said feed opening, means for delivering material by compressed air through said feed pipe, a valve for controlling the flow from said feed pipe to the receptacle, means within said receptacle for separating the upper portion thereof having the vent opening from the portion having the feed opening, said means acting to so direct the compressed feeding air, when the material within the receptacle has reached the separating means, as to cause said compressed air to level said material and said means further acting to confine the compressed air adjacent the feed opening when the material is leveled and the receptacle is substantially full, and means communicating with the interior of the receptacle operable by said confined air when the receptacle is full for operating the valve to stop the flow of material into the receptacle.

5. Apparatus for handling pulverulent material comprising a receptacle having a vent opening and having a feed opening in the upper portion thereof, a feed pipe in connection with said feed opening, means for delivering material by compressed air through said feed pipe, a valve for controlling the flow from said feed pipe to the receptacle, means within said receptacle for separating the upper portion thereof having the vent opening from the portion having the feed opening, said means acting to so direct the compressed feeding air, when the material within the receptacle has reached the separating means, as to cause said compressed air to level said material and said means further acting to confine the compressed air adjacent the feed opening when the material is leveled and the receptacle is substantially full, and means communicating with the interior of the receptacle including a diaphragm operable by said confined air when the receptacle is full for operating the valve to stop the flow of material into the receptacle.

6. Apparatus for handling pulverulent material comprising a receptacle having a vent opening and having a feed opening in the upper portion thereof, means for delivering material by compressed air to said feed opening, means within said receptacle for separating the upper portion thereof having the vent opening from the portion having the feed opening, said means acting to so direct the compressed feeding air, when the material within the receptacle has reached the separating means, as to cause said compressed air to level said material and further acting to confine the compressed air adjacent the feed opening when the material is level and when the receptacle is substantially full, a signal, and means communicating with the interior of the receptacle operable by said confined air when the receptacle is full for causing operation of said signal.

7. Apparatus for handling pulverulent material comprising a pair of receptacles each having a vent opening and a feed opening in the upper portion thereof, a main feed pipe, apparatus for delivering material by compressed air to said feed pipe, branch pipes extending from said main feed pipe to the feed openings in the receptacles, a valve for controlling the flow from said main feed pipe to the branch feed pipe of the first receptacle, means within said receptacle for separating the upper portion thereof having the vent opening from the portion having the feed opening, said means acting to so direct the compressed feeding air, when the material within the receptacle has reached the separating means as to cause said compressed air to level said material and further acting to confine the compressed air adjacent the feed opening when the material is leveled and when the receptacle is substantially full, means communicating with the interior of the receptacle operable by said confined air when the receptacle is full for operating the valve to the first branch pipe to stop the flow of material to the first receptacle and to cause it to flow further through the main pipe and second branch pipe to the second receptacle, and similarly associated elements in connection with the second receptacle for stopping the operation of the compressed air delivery apparatus when said second receptacle is full.

In testimony whereof, I affix my signature.

FREDERICK L. DORNBROOK.